(12) United States Patent
Quintero et al.

(10) Patent No.: US 10,067,262 B2
(45) Date of Patent: Sep. 4, 2018

(54) MULTI-VARIABLE WORKFLOW FOR CEMENT EVALUATION IN MULTIPLE CASING STRINGS

(71) Applicant: Halliburton Energy Services, Inc., Houston, TX (US)

(72) Inventors: Luis F. Quintero, Katy, TX (US); Ivo Foianini, Humble, TX (US); Javier Fadul, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/111,942

(22) PCT Filed: Sep. 4, 2015

(86) PCT No.: PCT/US2015/048449
§ 371 (c)(1),
(2) Date: Jul. 15, 2016

(87) PCT Pub. No.: WO2016/040133
PCT Pub. Date: Mar. 17, 2016

(65) Prior Publication Data
US 2016/0334540 A1 Nov. 17, 2016

Related U.S. Application Data

(60) Provisional application No. 62/048,420, filed on Sep. 10, 2014.

(51) Int. Cl.
*G01V 11/00* (2006.01)
*G01V 1/40* (2006.01)
(Continued)

(52) U.S. Cl.
CPC .............. *G01V 11/002* (2013.01); *G01V 1/40* (2013.01); *G01V 5/04* (2013.01); *G01V 5/08* (2013.01);
(Continued)

(58) Field of Classification Search
CPC . G01V 1/306; G01V 1/50; G01V 5/12; G01V 1/48; G01V 11/00; G01V 2210/6224; G01V 2210/6226; G01V 2210/6169
See application file for complete search history.

(56) References Cited

U.S. PATENT DOCUMENTS 3,815,677 A * 6/1974 Pennebaker, Jr. ... E21B 47/0005
166/253.1
5,089,989 A * 2/1992 Schmidt .............. E21B 47/0005
181/102
(Continued)

FOREIGN PATENT DOCUMENTS

WO WO-2014/084834 A1 6/2014

OTHER PUBLICATIONS

International Search Report and Written Opinion for PCT/US2015/048449 dated Nov. 26, 2015.
(Continued)

*Primary Examiner* — Hovhannes Baghdasaryan
(74) *Attorney, Agent, or Firm* — McDermott Will & Emery LLP

(57) ABSTRACT

Sonic data, ultrasonic data, density data, cased-hole neutron data, and open-hole neutron data of the wellbore are obtained. The sonic and ultrasonic data provides the amplitude, frequency, and phase of the altered sonic and ultrasonic waves. The far counts, near counts, and energy spectrum are obtained from density data, cased-hole (CH) neutron data, and open-hole (OH) neutron data. The amplitude, frequency, and phase provide the interface densities of the first, second,
(Continued)

and third interfaces. The hydrogen index (HI) of the formation and the cased wellbore are obtained from the CH and OH neutron data. The widths of the second and third interfaces are obtained from the HI's and the densities of the second and third interfaces.

20 Claims, 8 Drawing Sheets

(51) Int. Cl.
G01V 5/04 (2006.01)
G01V 5/08 (2006.01)
G01V 5/14 (2006.01)
G01V 5/10 (2006.01)

(52) U.S. Cl.
CPC .............. *G01V 5/104* (2013.01); *G01V 5/145* (2013.01); *G01V 11/00* (2013.01)

(56) References Cited

U.S. PATENT DOCUMENTS

| | | | | |
|---|---|---|---|---|
| 5,274,604 | A * | 12/1993 | D'Angelo | G01V 1/50 367/35 |
| 5,481,105 | A * | 1/1996 | Gold | G01V 5/107 250/265 |
| 5,627,368 | A * | 5/1997 | Moake | G01V 5/12 250/266 |
| 6,173,606 | B1 * | 1/2001 | Mosley | E21B 47/0005 166/253.1 |
| 6,552,333 | B1 * | 4/2003 | Storm | G01V 5/12 250/265 |
| 9,267,359 | B2 * | 2/2016 | Smaardyk | E21B 43/04 |
| 2004/0210393 | A1 * | 10/2004 | Ellis | G01V 5/125 702/8 |
| 2008/0116365 | A1 * | 5/2008 | Flecker | G01V 5/12 250/261 |
| 2009/0225949 | A1 * | 9/2009 | Wraight | H01J 35/06 378/89 |
| 2011/0253364 | A1 * | 10/2011 | Mosse | G01V 5/125 166/254.2 |
| 2011/0284732 | A1 | 11/2011 | Korkin et al. | |
| 2012/0075953 | A1 | 3/2012 | Chace et al. | |
| 2013/0345983 | A1 | 12/2013 | Guo | |
| 2014/0052376 | A1 * | 2/2014 | Guo | E21B 47/0005 702/11 |
| 2014/0103202 | A1 | 4/2014 | Kwong et al. | |
| 2015/0177409 | A1 * | 6/2015 | Sofiienko | G01V 5/125 250/269.1 |
| 2015/0198032 | A1 * | 7/2015 | Sinha | E21B 47/0005 166/250.01 |

OTHER PUBLICATIONS

Extended European Search Report from European Patent Application No. 15839446.0, dated Mar. 21, 2018, 6 pages.

* cited by examiner

MULTI-VARIABLE WORKFLOW FOR CEMENT EVALUATION IN MULTIPLE CASING STRINGS

CROSS-REFERENCE TO RELATED APPLICATIONS

This application claims priority under 35 U.S.C. § 119 to Provisional Application No. 62/048,420 filed on Sep. 10, 2014, in the United States Patent and Trademark Office (USPTO).

BACKGROUND

Completing an oil or gas well includes a cementing procedure that bonds one or more well casings lining a wellbore to a surrounding subterranean formation and between each other. In the vast majority of cases, as the well deepens, new casing strings are needed and cemented in place. Many other factors can also indicate the need for multiple concentric or overlapping casing strings, such as compliance with environmental and safety policies. In general, the cement between these casing strings prevents the presence or movement of fluids within the annular spaces defined between overlapping casings and between the casing and the wellbore wall. In some wells, the cementing process extends from total depth to surface, while in others the cement is present only between certain depths.

Of particular importance is the determination of the presence of fluid flow paths in the annular regions defined between overlapping casings and between the casing and the wellbore wall due to an absence of cement (or cement bond) at or between certain depths. The identification and characterization of these flow paths is particularly critical in the case of plug and abandonment operations, especially in deep water applications.

Sonic tools or ultrasonic tools are typically used in the industry to evaluate the cement bonding to both the formation and the casing and hence infer potential annular flow paths (i.e., leaks, channels, gaps, etc.). The evaluation in most of these cases uses raw data from only one system of sensors to infer fluid flow parameters through indirect methods. There is no current workflow method that integrates the various measurements obtained into a borehole model. Current methods are also typically used for the characterization of the first casing-cement bond, thereby precluding the evaluation of any subsequent interfaces in the case of multiple casing strings extended within the well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the field of producing hydrocarbons from wellbores and, more particularly, to methods of evaluating the integrity of bonds that adhere wellbore casing to a wellbore and to other casings.

The present disclosure describes improved methods and systems for cement evaluation and characterization in multiple casing strings that use sonic, ultrasonic, density, and neutron tools to provide a more direct and accurate measurement of the integrity of the cement bond through the evaluation of cement-casing interface density and annular equivalent density due to the presence of water, oil or gas. Previous attempts to evaluate the quality of cement bonding were based on indirect methods that use data only from sonic and/or ultrasonic tools to determine cement parameters such as compressive strength or cement bond. Embodiments of the present disclosure, on the other hand, provide more direct and accurate measurements of cement bond quality and cement sheath characterization using sonic, ultrasonic, and density tools. The presently described methods enhance the evaluation and characterization of cement within wellbores without requiring investment in new tools, new tool hardware, or adaptations of existing tools.

Figure 1:
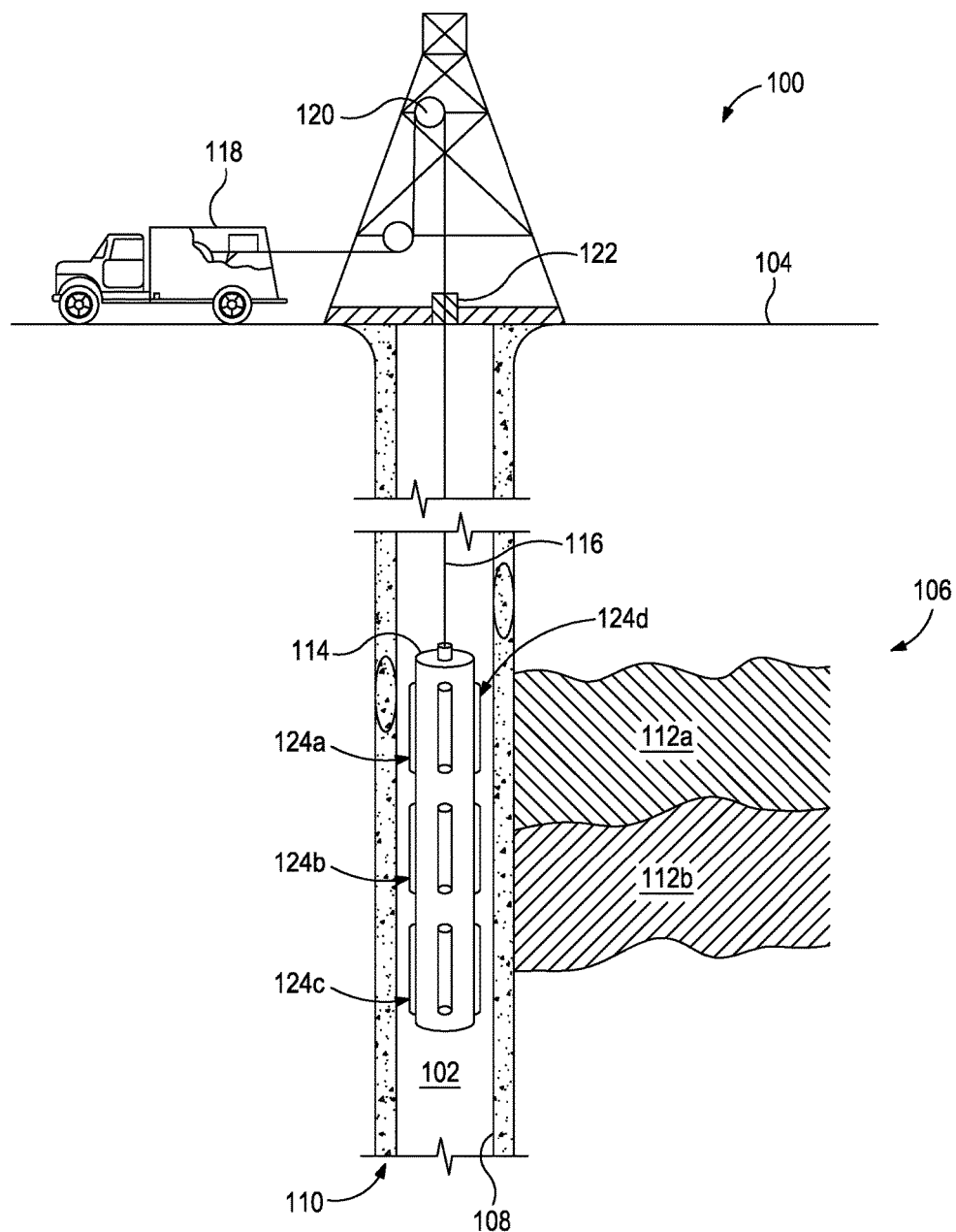
FIG. 1 is a well system that can employ the principles of the present disclosure.

FIG. 1 is a schematic of an exemplary well system 100 that may employ the principles of the present disclosure. As illustrated, a wellbore 102 has been drilled from a surface location 104 into a subterranean formation 106 containing hydrocarbons entrained therein. Set within the wellbore 102 is at least one string of casing 108 bonded to the inner surface of the wellbore 102. The casing 108 is secured within the wellbore 102 by flowing cement 110 into the annulus formed between the outer diameter of the casing 108 and the inner diameter of the wellbore 102. The resulting cement bond not only adheres the casing 108 within the wellbore 102, but also serves to isolate adjacent zones 112*a* and 112*b* within the formation 106 from one another. Isolating the adjacent zones 112*a,b* can be important when one of the zones 112*a,b* contains oil or gas and the other zone includes a non-hydrocarbon fluid, such as water. Should the cement 110 surrounding the casing 108 be defective and fail to provide isolation of the adjacent zones 112*a,b*, water or other non-hydrocarbon fluids can migrate into the hydrocarbon producing zone, thus diluting or contaminating the hydrocarbons within the producing zone. Additionally, defective cement 110 can result in the fluids from the zones 112*a,b* migrating to the surface location 104 through the annulus surrounding the casing 108.

To detect possible defective cement bonds between the casing 108 and the wellbore 102 and between overlapping lengths of casing 108, a tool string 114 may be introduced into the wellbore 102 on a conveyance 116, such as wireline or slickline. Other suitable conveyances can include, however, drill pipe, coiled tubing, a downhole tractor, production tubing, and the like. In some embodiments, the conveyance 116 may be connected to a surface processing unit 118 included, for example, in a truck or other surface structures or rigs. The conveyance 116 feeds the tool string 114 into the wellbore 102 via a pulley system 120 and through a wellhead installation 122, such as a lubricator or the like. The tool string 114 may include one or more wireline logging tools developed for analyzing the integrity of the cement 110 that bonds the casing 108 to the wellbore 102. As illustrated, for instance, the tool string 114 may include a sonic data tool 124a, an ultrasonic data tool 124b, a bulk density tool 124c, and a neutron porosity tool 124d.

The sonic data tool 124a may be one of a cement bond log (CBL) tool, a radial cement bond log (RCBL) tool, and an open-hole mono-pole sonic tool. The ultrasonic data tool 124b may be one of an ultrasonic pulse-echo scanner and a flexural scanner. The bulk density tool 124c may be an open-hole nuclear density porosity tool. The neutron porosity tool 124d may be a cased-hole (CH) nuclear porosity tool capable of being run in a cased wellbore.

Figure 2:
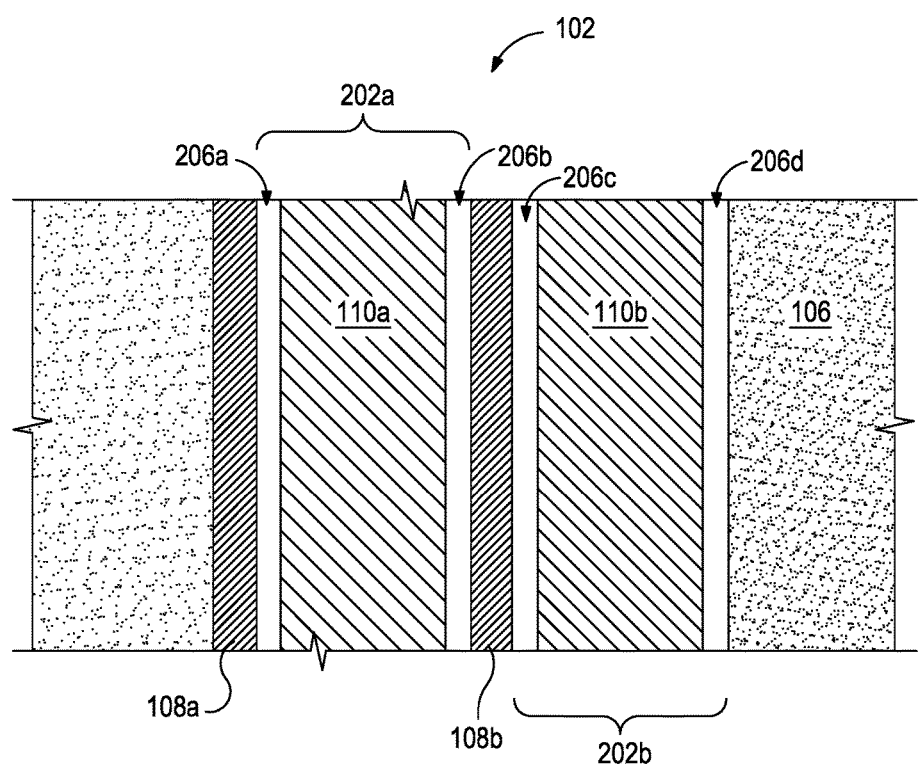
FIG. 2 depicts an enlarged cross-sectional view of a portion of the wellbore of FIG. 1.

FIG. 2 depicts an enlarged cross-sectional view of a portion of the wellbore 102 of FIG. 1 lined with a first casing 108a and a second casing 108b. A first cement layer 110a interposes the first and second casings 108a,b and is otherwise disposed within a first annulus 202a defined between the outer diameter of the first casing 108a and the inner diameter of second casing 108b. A second cement layer 110b interposes the second casing 108b and the formation 106 and is otherwise disposed within a second annulus 202b defined between the outer diameter of the second casing 108b and the formation 106. The first and second cement layers 110a,b serve to bond the first and second strings of casing 108a,b to the surrounding formation 106 and to each other.

A first casing-cement interface 206a is provided at the outer diameter of the first casing 108a and the first cement layer 110a. A second casing-cement interface 206b is provided at the inner diameter of the second casing 108b and the first cement layer 110a. A third casing-cement interface 206c is provided at the outer diameter of the second casing 108b and the second cement layer 110b, and a fourth casing-cement interface 206d is provided at the inner diameter of the formation 106 and the second cement layer 110b. According to the present disclosure, the wireline logging tools or sensors of the tool string 114 (FIG. 1) may be used to identify and evaluate the casing-cement interfaces 206a-d.

Figure 3:
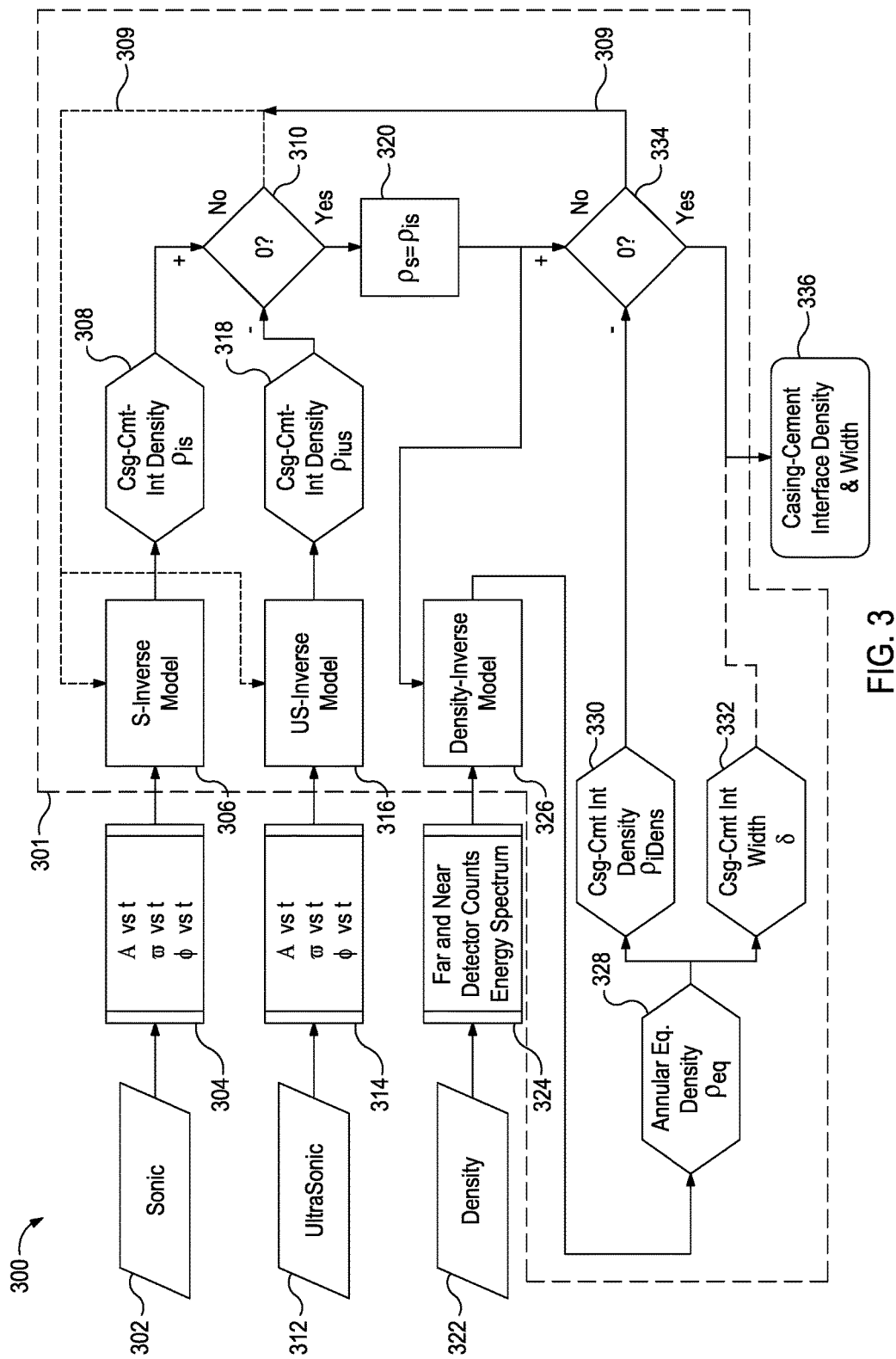
FIG. 3 depicts an exemplary workflow method used to characterize the first cement interface of FIG. 2.

FIG. 3 depicts an exemplary workflow method 300 for characterizing the first casing-cement interface 206a. As illustrated, the workflow method 300 operates with the input of sonic, ultrasonic, and density data, which may be acquired through operation of the sonic tool 124a, the ultrasonic tool 124b, and the bulk density tool 124c, respectively, of the tool string 114 of FIG. 1.

At 302, the sonic tool 124a obtains sonic data from the media present within the annulus (also referred to herein as "annular media"), which, for instance, may be characterized as the cement 110a,b (FIG. 2) in the annuli 202a,b (FIG. 2). Briefly, the sonic tool 124a operates by emitting an acoustic wave (also referred to as a sonic acoustic wave or a sonic wave) into the wellbore 102 and the formation 106. The sonic wave interacts with the media within the annuli 202a,b, and characteristics of the sonic wave are thereby altered according to the physical properties of the annular media. For instance, an amplitude (A), frequency ($\omega$), and/or phase ($\varphi$) of the sonic wave may be modified and at least a portion of the modified sonic wave is reflected back to the sonic tool 124a, thereby resulting in the sonic data.

A deconvolution operation may then be performed on the sonic data, as at 304, to obtain amplitude (A), frequency ($\omega$), and/or phase ($\varphi$) of the modified sonic wave. The de-convoluted amplitude (A), frequency ($\omega$), and phase ($\varphi$) may then be provided to a sonic-inverse (S-inverse) model, as at 306. The S-inverse model calculates the density value ($\rho_{is}$) of the annular media, as at 308.

As is known, acoustic impedance is a product of acoustic wave velocity and media density. The S-inverse model of 306 may be configured to predict the acoustic impedance of the annular media and then calculate the density $\rho_{is}$ thereof based on the ratio of the predicted acoustic impedance. The density of the cement may be a known value. The sonic tool 124a determines the density $\rho_{is}$ of the annular media based on the modified sonic wave. The S-inverse model further compares the density of the annular media as obtained by the S-inverse model with the density of the annular media as determined by the sonic tool 124a. If the difference in these two density values is within a desired proximity of each other (based on a predetermined standard deviation, for example), the density calculated by the S-inverse model is considered as the equivalent density measurement for the media present within the annulus 202a,b. If the difference in the two density values is not within the desired proximity, however, the S-inverse model may then be configured to predict new values of the acoustic impedance of the annular media and recalculate the density using the new predictions. The process iteratively repeats until the two density values are obtained within the desired proximity of each other.

The ultrasonic tool 124b operates in a similar manner as the sonic tool 124a, except that the acoustic wave (referred herein as an ultrasonic acoustic wave or an ultrasonic wave) emitted by the ultrasonic tool 124b has a higher frequency than the acoustic wave emitted by the sonic tool 124a. Because of its higher frequency, the ultrasonic wave has a relatively smaller depth of investigation as compared to the sonic wave. For instance, the ultrasonic wave may at most traverse the first casing-cement interface 206a (FIG. 2) before it dissipates or "dies down." In contrast, due to its lower frequency, the sonic wave may penetrate further into the wellbore 102 and the formation 106.

As with the sonic wave, the ultrasonic wave may also be modified by the annular media and the modified ultrasonic wave may be received by the ultrasonic tool 124b. For instance, an amplitude (A), frequency ($\omega$), and/or phase ($\varphi$) of the ultrasonic wave may be modified according to the physical properties of the media in the annulus 202a (FIG. 2), thereby resulting in the ultrasonic data, as at 312. The acquired ultrasonic data may be indicative of the density of the annular media.

The ultrasonic data then undergoes a deconvolution operation, as at 314, resulting in de-convoluted amplitude (A), frequency ($\omega$), and phase ($\varphi$) of the modified ultrasonic wave. An ultrasonic-inverse (US-inverse) model may operate on the de-convoluted amplitude (A), frequency ($\omega$), and phase ($\varphi$), as at 316, and may provide a calculation of the density ($\rho_{iUS}$) of the annular media, as at 318. As with the S-inverse model, the US-inverse model calculates the density value $\rho_{iUS}$ based on the ratio of the acoustic impedances of the annular media. Because ultrasonic waves may not traverse beyond the first casing-cement interface 206a, the density $\rho_{iUS}$ of the annular media as calculated by the ultrasonic tool 124b may be the density of the material (or media) at the first casing-cement interface 206a. The density $\rho_{iUS}$ obtained by the US-inverse model may be optimized and refined (e.g., iteratively), in a similar manner as mentioned above with respect to the S-inverse model.

At 310, the density $\rho_{is}$ of the annular media obtained at 308 may be compared with the density $\rho_{iUS}$ of the annular media obtained at 318. If the two density values are not within a desired proximity of each other (e.g., based on a predetermined standard deviation), the S-inverse model and/ or the US-inverse model may be updated, as at 309, and the respective density values are then recalculated based on an updated S-inverse model and/or an updated US-inverse model. For instance, the corresponding inverse models may predict a different value of acoustic impedance of the annular media and recalculate the density based on the different values. The process may iteratively repeat until the density values are within the desired proximity of each other, and thereby obtaining the density value of the media in the first casing-cement interface 206a as measured by the sonic tool 124a, as at 320.

Figure 4A:
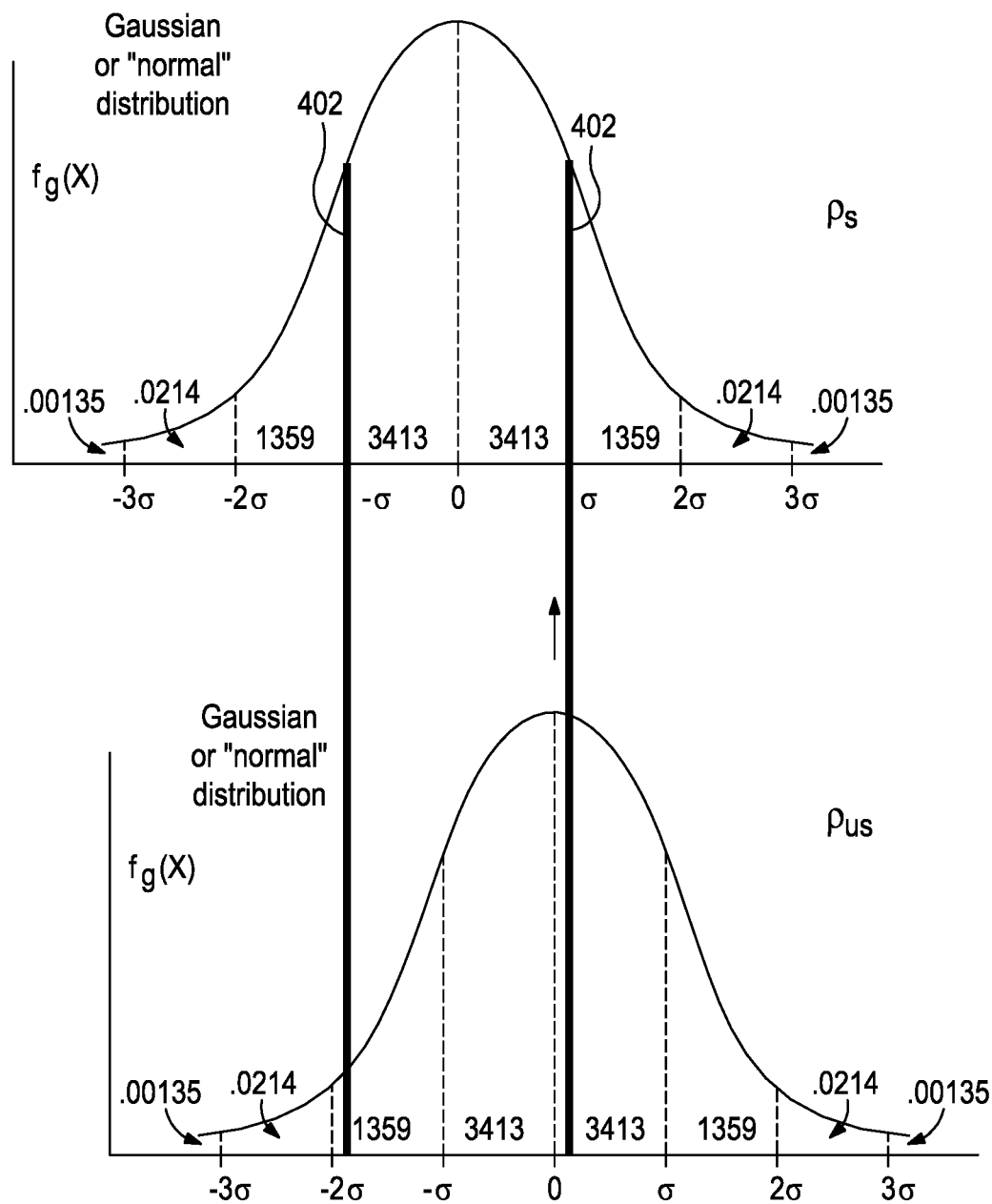
FIGS. 4A-4C are comparison plots showing density values derived from acoustic data.
Figure 4B:
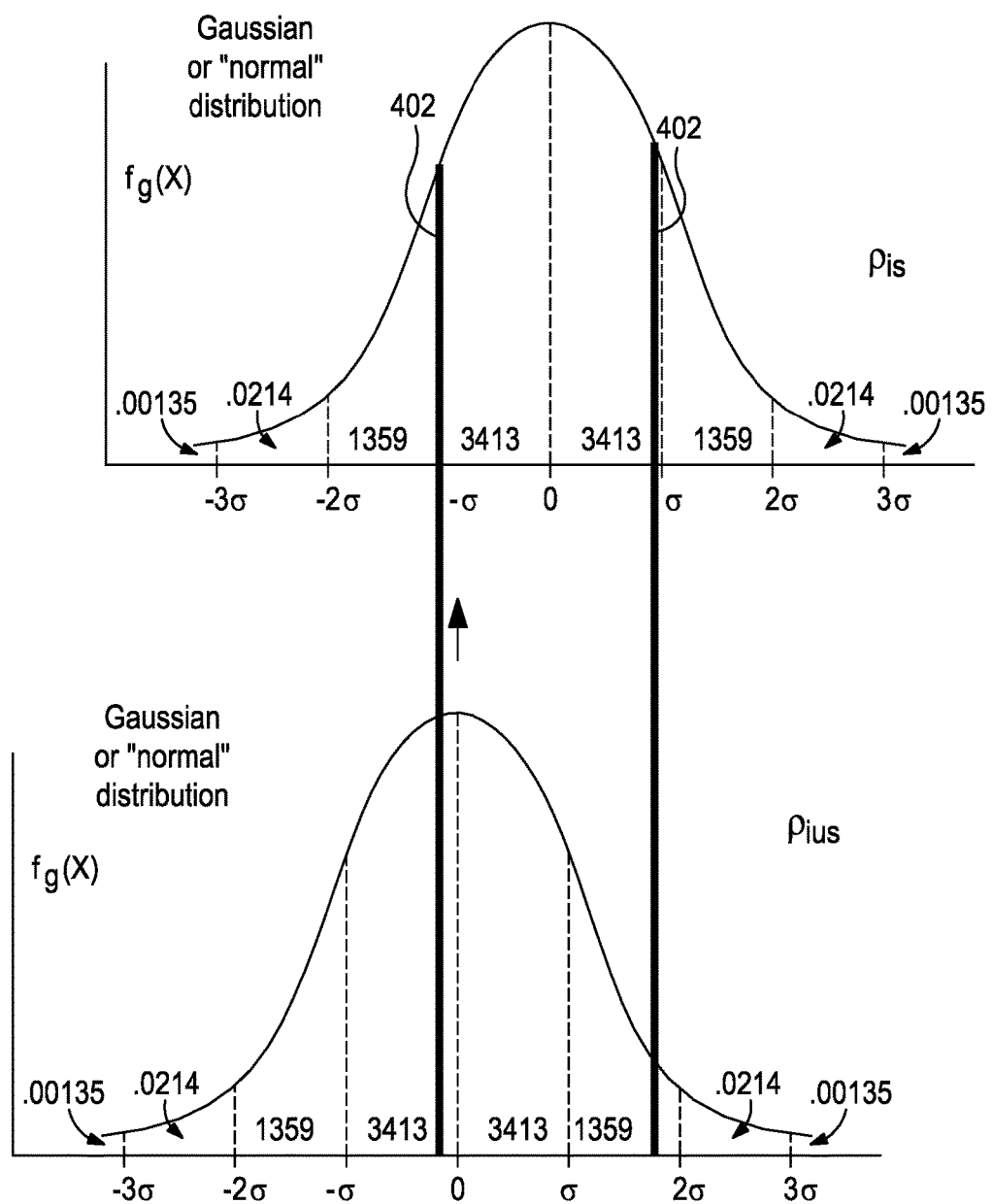
Figure 4C:
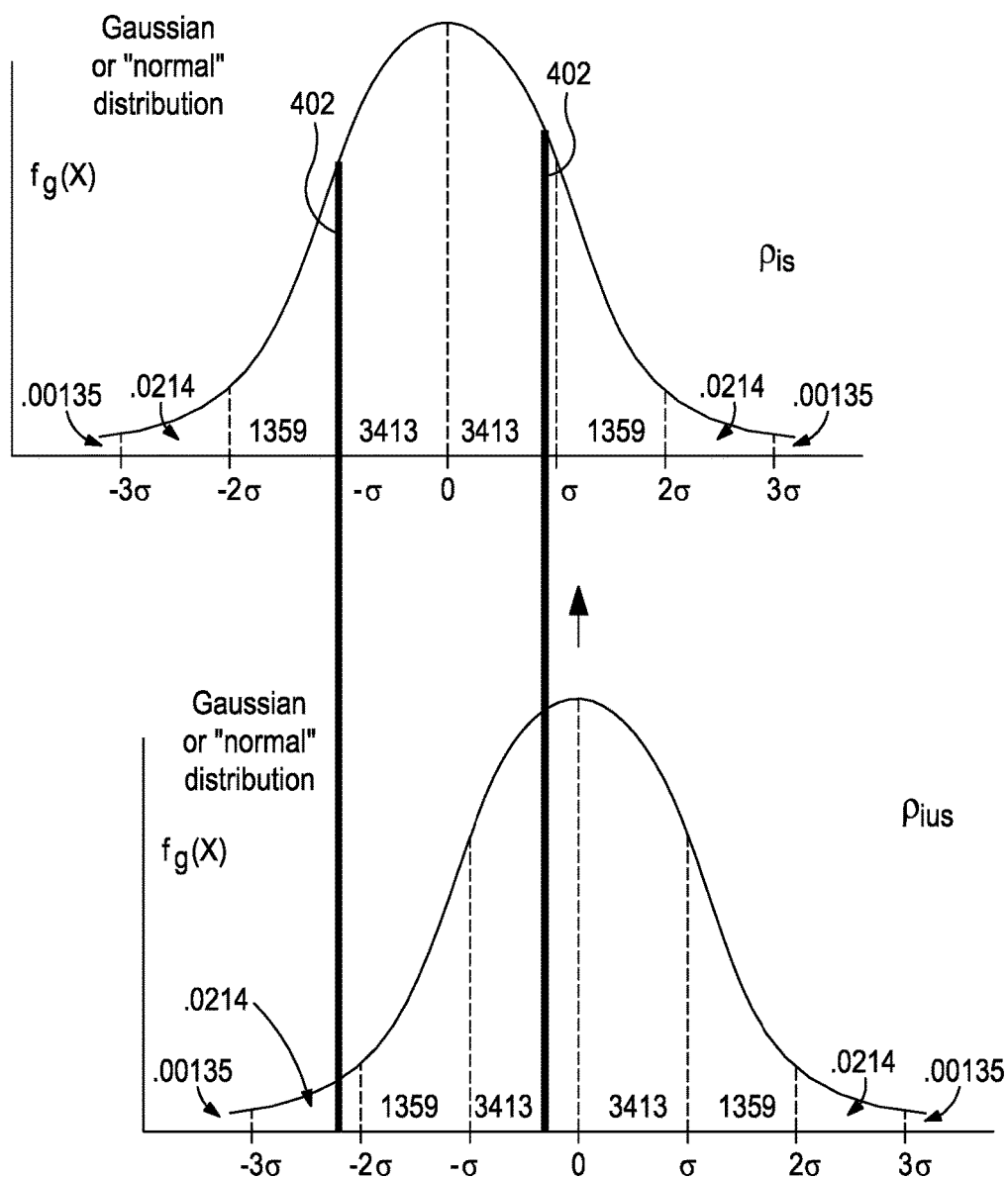

Referring briefly to FIGS. 4A-4C, illustrated are three plots depicting a comparison of example density measurements. The density measurements are illustrated as a Normal (or Gaussian) distribution. In FIG. 4A, the top plot depicts the density measurements ($\rho_S$) obtained from the sonic tool 124a, while the bottom plot depicts the density measurements ($\rho_{US}$) obtained from the ultrasonic tool 124b. The vertical lines 402 represent the acceptable range of standard deviation that may be observed between the two density measurements ($\rho_S$, $\rho_{US}$). As illustrated, the peak of the bell curve of the Normal distribution of the density measurements ($\rho_{US}$) obtained by the ultrasonic tool 124b is within the vertical lines 402. The density measurements ($\rho_{US}$) obtained from the ultrasonic tool 124b and the density measurement ($\rho_S$) obtained from the sonic tool 124a may, therefore, be considered to be within the desired proximity of each other.

In FIG. 4B, the top plot depicts the density measurements ($\rho_{iS}$) obtained from the S-inverse model (as at 306, FIG. 3), while the bottom plot depicts the density measurements ($\rho_{iUS}$) obtained from the US-inverse model (as at 316, FIG. 3). The vertical lines 402 represent the acceptable range of standard deviation that may be observed between the two density measurements ($\rho_{iS}$, $\rho_{iUS}$). As illustrated, the peak of the bell curve of the Normal distribution of the density measurements ($\rho_{iUS}$) obtained from the US-inverse model is within the vertical lines 402. The density measurements ($\rho_{iUS}$) obtained from the US-inverse model may thus be considered to be within the desired proximity of the density measurements ($\rho_{iS}$) obtained from the S-inverse model.

In contrast, in some instances, the density measurements ($\rho_{iUS}$) obtained from the US-inverse model and the density measurements ($\rho_{iS}$) obtained from the S-inverse model may not be considered within the desired proximity of each other. In FIG. 4C, for instance, the peak of the bell curve of the Normal distribution of $\rho_{iUS}$ is outside the vertical lines 402. In this case, the density measurements may have to be recalculated, as mentioned above.

Returning to FIG. 3, the density data is obtained using the density tool 124c of FIG. 1, as at 322. In operation, the density tool 124c emits gamma rays into the wellbore 102, which are scattered by the annular media and the formation 106. Based on the gamma rays returning to the density tool 124c, density data including the far counts, the near counts, and an energy spectrum of the scattered gamma rays is obtained. The density of the annular media in the annulus 202a may then be calculated based on the density data.

The density data undergoes a deconvolution operation, as at 324, and results in the far counts, the near counts, and the energy spectrum of the scattered gamma rays. As at 326, the results of the deconvolution operation are provided to a density-inverse (D-inverse) model along with the density value of the annular media in the first casing-cement interface 206a obtained at 320. The D-inverse model may be configured to predict the equivalent density ($\rho_{eq}$) of the annular media using the inputs thereto, as at 328. The equivalent density of the annular media includes the density of the media at the first casing-cement interface 206a and the density of the cement 110.

From the equivalent density $\rho_{eq}$ of the annular media, the density ($\rho_{iDens}$), of the media at the first casing-cement interface 206a may be predicted, as at 330. For instance, the density $\rho_{iDens}$ of the media at the first casing-cement interface 206a may be predicted based on a known density value of the cement 110. As at 334, the density value obtained at 330 may be compared to the density value of the media in the first casing-cement interface 206a obtained at 320. If the difference in the two density values is not within a desired proximity of each other (e.g., based on a predetermined standard deviation), the S-inverse model and/or the US-inverse model may be updated, as at 309. The updated model(s) may then recalculate the corresponding density values, and the process iteratively repeats until the density values derived from the S-inverse model and the D-inverse model are within a desired proximity of each other.

Once the density values are within the desired proximity of each other, the density of the media in the first casing-cement interface 206a is thereby known and otherwise obtained. In addition, based on the density of the media at the first casing-cement interface 206a, the width ($\delta$) of any "gap" present at the first casing-cement interface 206a may be determined, as at 332. Herein, the term "gap" may refer to any non-solid interface located between the outer diameter of the first casing 108a and the cement 110a. The workflow method 300 may then terminate with the calculation of the density of the media at the first casing-cement interface 206a and a thickness of the annular media, at 336. As illustrated, some of the processes of the workflow method 300 form a sub-routine 301, which may be used in the exemplary workflow method 500 of FIG. 5 discussed below and used to characterize the second, third, and fourth casing-cement interfaces 206b-d.

Figure 5:
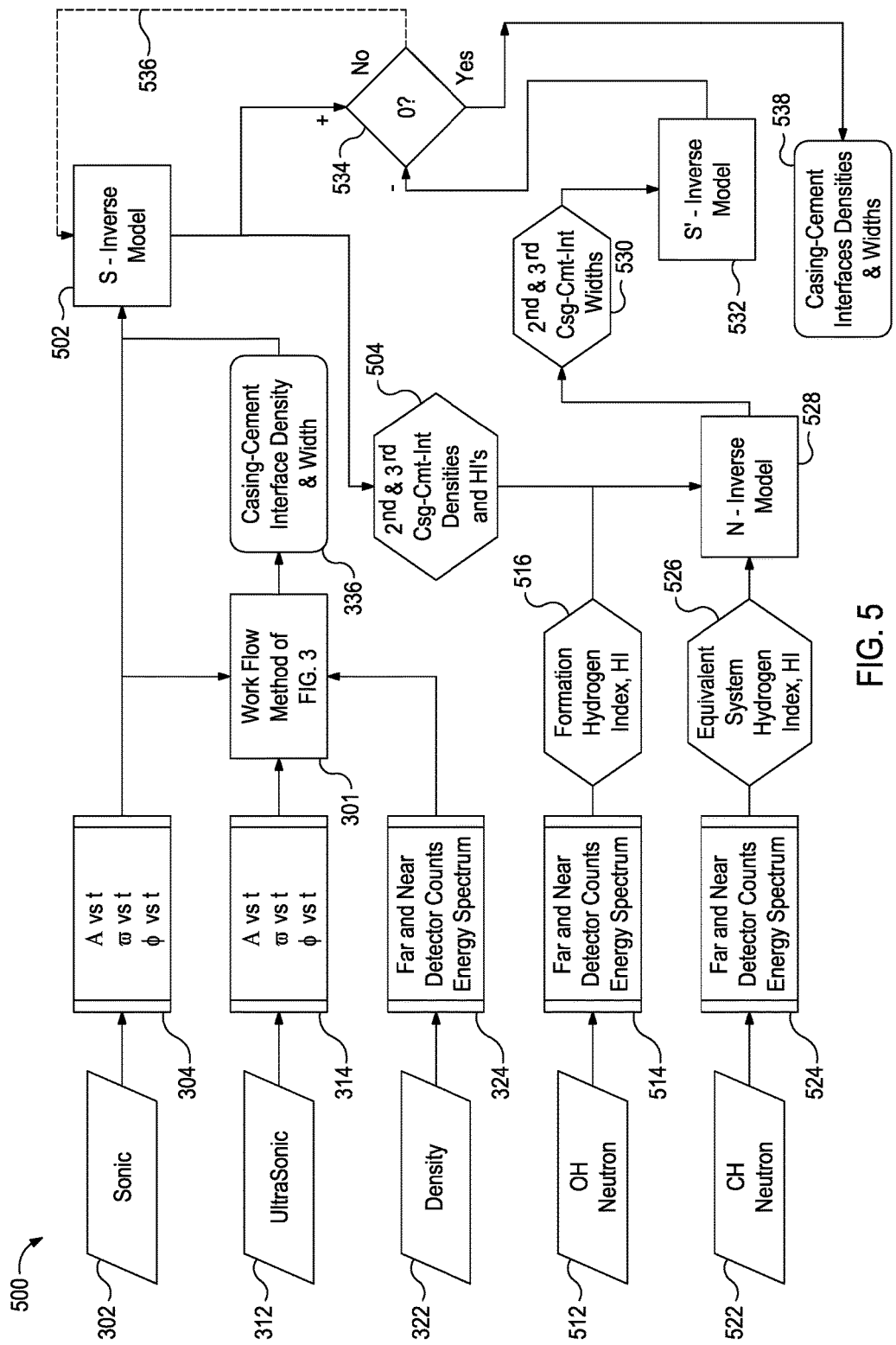
FIG. 5 depicts an exemplary workflow method used to characterize the second, third, and fourth cement interfaces of FIG. 2.

FIG. 5 depicts an exemplary workflow method 500 for characterizing the second, third, and fourth casing-cement interfaces 206b-d of FIG. 2. The workflow method 500 may incorporate some of the processes of the workflow method 300 of FIG. 3, and therefore may be best understood with reference thereto where like numerals designate like components not described again in detail. The results of the respective deconvolution operations performed at 304, 314, and 324 described above in the workflow method 300 of FIG. 3 may be provided to the sub-routine 301 (FIG. 3) to obtain the density of the media in the first casing-cement interface 206a and the thickness of the media, as at 336. The density and thickness of the media, as obtained at 336, together with the amplitude (A), frequency ($\omega$), and/or phase ($\varphi$) obtained from the deconvolution operation (304) may be provided to a second Sonic-inverse model (S-inverse model), as at 502.

The depth of investigation of the ultrasonic tool 124b and the density tool 124c is relatively smaller than the depth of investigation of the sonic tool 124a. As mentioned above, the ultrasonic wave from the ultrasonic tool 124b at most traverse the first casing-cement interface 206a before it dissipates or "dies down." Similarly, gamma rays from the density tool 124c may at most penetrate to the second casing-cement interface 206b. However, the sonic wave from the sonic tool 124a may penetrate to the formation 106.

The second S-inverse model 502 may be configured to predict the equivalent density for the annular media at the second and third casing-cement interfaces 206b,c, as at 504. For instance, the equivalent density may be predicted based on the ratio of the acoustic impedances of the annular media the sonic wave encounters. Using the equivalent density, the second S-inverse model 502 may also predict the equivalent hydrogen index (HI) of the media at the first and second casing-cement interfaces 206b,c, as at 504.

At 512, open-hole (OH) neutron data is obtained and subsequently undergoes a deconvolution operation, at 514, resulting in the far counts and the near counts of the neutrons scattered by the formation 106, and an energy spectrum. It should be noted that the open-hole neutron data is obtained from the measurements performed on the formation 106 prior to casing the wellbore 102. Based on the results of the deconvolution operation, the hydrogen index (HI) of the formation 106 is obtained at 516.

The cased-hole (CH) neutron data, obtained at 522, also undergoes a deconvolution operation, at 524, that results in the corresponding far counts and near counts of the scattered neutrons, and a corresponding energy spectrum of the annular media in the first and second annuli 202a,b. Based on the results of the deconvolution operation, an equivalent hydrogen index of the system including the first and second casings 108a,b, the first and second cement layers 110a,b and the formation 106 is obtained, as at 526.

The equivalent density and the equivalent hydrogen index of the second and third casing-cement interfaces 206b,c obtained at 504, the hydrogen index of the formation 106 obtained at 516, and the equivalent hydrogen index of the system obtained at 526 are each provided to a Neutron-inverse model (N-inverse model), as at 528. The N-inverse model then predicts the hydrogen index of the fourth casing-cement interface 206d based on the given inputs.

From the hydrogen indices obtained at 504 and 528, the width of the second and third casing-cement interfaces 206b,c may be obtained, as at 530. In order to ensure that the widths of the second and third casing-cement interfaces 206b,c obtained at 530 are within a predetermined standard deviation, the widths are provided to a third S-inverse model, which then predicts the density of the material at the second and third casing-cement interfaces 206b,c based on the obtained widths, as at 532. At 534, the predicted density is compared with the density of the annular media obtained from the second S-inverse model (at 502). If the difference in the two density values is not within the predetermined standard deviation, the error is fed back (as at 536) to the second S-inverse model, which then re-calculates the corresponding density and the workflow continues based on the recalculated value. The comparison may serve as a check to determine whether the density of the media at the second and third casing-cement interfaces 206b,c as obtained based on the hydrogen indices is within the desired proximity of the density of the same media as measured by the second S-inverse model.

Once the density values are within the desired proximity (as at 536), the workflow method 500 may determine the presence of a non-solid interface (i.e., a gap) in each of the first casing-cement interface 206a, second casing-cement interface 206b, third casing-cement interface 206c, and fourth casing-cement interface 206d, as at 538. In determining the presence of the fourth casing-cement interface 206d, the workflow method 500 compares whether the hydrogen index (HI) of the formation 106 obtained at 516 and the hydrogen index of the system obtained at 526 are within a desired proximity of each other (e.g., based on a predetermined standard deviation). If these are not the same, it may be determined that the difference in the hydrogen indices is due to an increment in hydrogen content caused because of fluid (gas, water, or any other media) present in an additional interface, the fourth interface 206d (since the other interfaces 206a-c have all been previously determined). This fluid filled gap has a width and density. Since the wellbore parameters (e.g., wellbore size, number of casings, casing and cement widths) are known, the density of the fluid at the fourth interface 206d and the width of the fourth interface 206d that results in the increased hydrogen index may be determined via an iterative process. The presence of a gap at any of the casing-cement interfaces 206a-d may be indicative of a poor cement bond.

Using the workflow method 500, an operator may be able to determine the presence of any gaps and may take necessary steps to seal the gap(s) so that fluids from the zones 112a,b (FIG. 1) or any other undesirable downhole fluids are prevented from migrating to the surface location 104 (FIG. 1).

Figure 6:
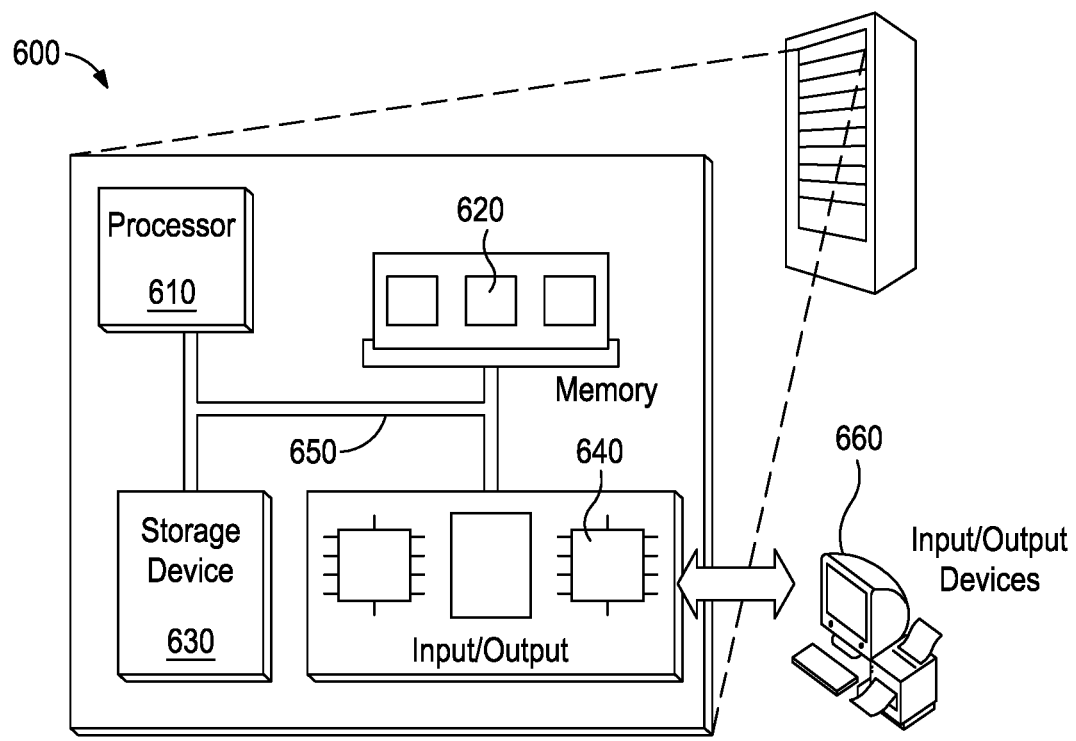
FIG. 6 illustrates an exemplary processing system for configuring and/or controlling the tool string of FIG. 1 and/or to implement the workflows of FIGS. 3 and 5.

FIG. 6 shows an illustrative processing system 600 for configuring and/or controlling the tool string 114 of FIG. 1, to implement the workflow 300 of FIG. 3, and/or to implement the workflow 500 of FIG. 5. The system 600 may include a processor 610, a memory 620, a storage device 630, and an input/output device 640. Each of the components 610, 620, 630, and 640 may be interconnected, for example, using a system bus 650. The processor 610 may be processing instructions for execution within the system 600. In some embodiments, the processor 610 is a single-threaded processor, a multi-threaded processor, or another type of processor. The processor 610 may be capable of processing instructions stored in the memory 620 or on the storage device 630. The memory 620 and the storage device 630 can store information within the computer system 600.

The input/output device 640 may provide input/output operations for the system 600. In some embodiments, the input/output device 640 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 660. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A. A method that includes introducing a tool string into a wellbore drilled through a formation and at least partially lined with a first casing and a second casing concentrically overlapping a portion of the first casing, wherein a first annulus is defined between the first and second casings and filled with a first annular media, and a second annulus is defined between the second casing and a wall of the wellbore and filled with a second annular media, obtaining sonic data of the first and second annular media using a sonic wave emitted from a sonic data tool included in the tool string, performing a first deconvolution operation on the sonic data to obtain an amplitude, a frequency, and a phase of the sonic wave as altered by the first and second annular media, obtaining ultrasonic data of the first annular media using an ultrasonic wave emitted from an ultrasonic data tool included in the tool string, performing a second deconvolution operation on the ultrasonic data to obtain an amplitude, a frequency, and a phase of the ultrasonic wave as altered by the first annular media, obtaining density data of the first annular media using gamma rays emitted by a density tool included in the tool string, performing a third deconvolution operation on the density data to obtain far counts, near counts, and an energy spectrum of the first annular media, obtaining cased-hole neutron data using a neutron porosity tool included in the tool string, performing a fourth deconvolution operation on the cased-hole neutron data to obtain far counts and near counts of gamma rays generated via neutron scattering due to one or more of the first and second casings, the first and second annular media, and the formation, and to obtain an energy spectrum of the formation and the first and second annular media, obtaining open-hole neutron porosity log data from measurements performed on the formation prior to casing the wellbore, and performing a fifth deconvolution operation on the open-hole neutron porosity log data to obtain far counts and near counts of gamma rays generated due to neutron scattering in the formation, and to obtain an energy spectrum of the formation.

B. A well system that includes a tool string conveyable into a wellbore drilled through a formation and at least partially lined with a first casing and a second casing concentrically overlapping a least a portion of the first casing, wherein a first annulus is defined between the first and second casings and filled with a first annular media, and a second annulus is defined between the second casing and wellbore and filled with a second annular media, and a computer system including a processor and a non-transitory computer readable medium, the computer system being communicatively coupled to the tool string and the computer readable medium storing a computer readable program code that, when executed by the processor, configures the processor to operate a sonic tool included in the tool string to obtain sonic data of the first and second annular media using a sonic wave emitted by the sonic data tool, perform a first deconvolution operation on the sonic data to obtain an amplitude, a frequency, and a phase of the sonic wave as altered by the first and second annular media, operate an ultrasonic tool included in the tool string to obtain ultrasonic data of the first annular media using an ultrasonic wave emitted from the ultrasonic data tool, perform a second deconvolution operation on the ultrasonic data to obtain an amplitude, a frequency, and a phase of the ultrasonic wave as altered by the first annular media, operate a density tool included in the tool string to obtain density data of the first annular media using gamma rays emitted by the density tool, perform a third deconvolution operation on the density data to obtain far counts, near counts, and an energy spectrum of the first annular media, operate a neutron porosity tool included in the tool string to obtain cased-hole neutron data, perform a fourth deconvolution operation on the cased-hole neutron data to obtain far counts and near counts of gamma rays generated via neutron scattering due to one or more of the first and second casings, the first and second annular media, and the formation, and to obtain an energy spectrum of the formation and first and second annular media, obtain open-hole neutron porosity log data from measurements performed on the formation prior to casing the wellbore, and perform a fifth deconvolution operation on the open-hole neutron porosity log data to obtain far counts and near counts of gamma rays generated due to neutron scattering in the formation, and to obtain an energy spectrum of the formation.

Each of embodiments A and B may have one or more of the following additional elements in any combination: Element 1: further comprising performing a first inverse modeling operation on the amplitude, the frequency, and the phase obtained via the first deconvolution operation to obtain a first density value of the first annular media based on an acoustic impedance characteristic of the first annular media, performing a second inverse modeling operation on the amplitude, the frequency, and the phase obtained via the second deconvolution operation to obtain a second density value of the first annular media based on the acoustic impedance characteristic of the first annular media, and comparing the first density value and the second density value to determine whether the first and second density values are within a desired proximity of each other. Element 2: further comprising obtaining a first interface density from the first density value when the first and second density values are within a desired proximity of each other, the first interface density being a density value of an interface of the first casing and the first annular media. Element 3: further comprising recalculating at least one of the first density value and the second density value when the first and second density values are not within the desired proximity of each other. Element 4: further comprising obtaining a third density value of the first annular media by performing a third inverse modeling operation using the first interface density, and far counts, near counts, and an energy spectrum of the first annular media obtained via the third deconvolution operation, obtaining a second interface density based on the third density value, the second interface density being a density value of the interface of the first casing and the first annular media, and comparing the first interface density with the second interface density and obtaining a density of the interface of the first casing and the first annular media when the first and second interface densities are within a desired proximity of each other. Element 5: further comprising recalculating at least one of the first and second density values when the first and second interface densities are not within the desired proximity of each other. Element 6: further comprising obtaining a first width of the interface at the first casing and the first annular media when the first and second interface densities are within the desired proximity of each other. Element 7: further comprising performing a fourth inverse modeling operation using the density of the first annular media and the first width to calculate a second interface density and a third interface density, the second interface density being a density value of an interface of the second casing and the first annular media and the third interface density being a density value of an interface of the second casing and the second annular media, calculating an annular media hydrogen index of each of the first annular media and the second annular media, calculating an open-hole hydrogen index of the formation using the open-hole neutron porosity log data, and a cased-hole hydrogen index of the wellbore using the cased-hole neutron data, calculating a second width of the interface of the second casing and the first annular media and a third width of the interface of the second casing and the second annular media via a fifth inverse modeling operation performed on the second and third interface densities, the annular media hydrogen index, the open-hole hydrogen index, and the cased-hole hydrogen index, performing a sixth inverse modeling operation using the second and third widths to calculate the second interface density and the third interface density, and comparing the second interface density and the third interface density calculated via the fourth inverse modeling operation with the second interface density and the third interface density calculated via the sixth inverse modeling operation. Element 8: further comprising obtaining the first, second, third interface densities and a fourth interface density when the second interface density calculated via the fourth inverse modeling operation is within a desired proximity of the second interface density calculated via the sixth inverse modeling operation, and the third interface density calculated via the fourth inverse modeling operation is within a desired proximity of the third interface density calculated via the sixth inverse modeling operation, the fourth interface density being a density value of an interface of the formation and the second annular media. Element 9: further comprising recalculating at least one of the second interface density and the third interface density calculated via the fourth inverse modeling operation when the second interface density calculated via the fourth inverse modeling operation is not within a desired proximity of the second interface density calculated via the sixth inverse modeling operation, or when the third interface density calculated via the fourth inverse modeling operation is not within a desired proximity of the third interface density calculated via the sixth inverse modeling operation.

Element 10: wherein the processor is further configured to perform a first inverse modeling operation on the amplitude, the frequency, and the phase obtained via the first deconvolution operation to obtain a first density value of the first annular media based on an acoustic impedance characteristic of the first annular media, perform a second inverse modeling operation on the amplitude, the frequency, and the phase obtained via the second deconvolution operation to obtain a second density value of the first annular media based on the acoustic impedance characteristic of the first annular media, and compare the first density value and the second density value to determine whether the first and second density values are within a desired proximity of each other. Element 11: wherein the processor is further configured to obtain a first interface density from the first density value when the first and second density values are within a desired proximity of each other, the first interface density being a density value of an interface of the first casing and the first annular media. Element 12: wherein the processor is further configured to recalculate at least one of the first density value and the second density value when the first and second density values are not within the desired proximity of each other. Element 13: wherein the processor is further configured to obtain a third density value of the first annular media by performing a third inverse modeling operation using the first interface density, and far counts, near counts, and an energy spectrum of the first annular media obtained via the third deconvolution operation, obtain a second interface density based on the third density value, the second interface density being a density value of the interface of the first casing and the first annular media, and compare the first interface density with the second interface density and obtaining a density of the interface of the first casing and the first annular media when the first and second interface densities are within a desired proximity of each other. Element 14: wherein the processor is further configured to recalculate at least one of the first and second density values when the first and second interface densities are not within the desired proximity of each other. Element 15: wherein the processor is further configured to calculate a first width of the interface at the first casing and the first annular media when the first and second interface densities are within the desired proximity of each other. Element 16: wherein the processor is further configured to perform a fourth inverse modeling operation using the density of the first annular media and the first width to calculate a second interface density and a third interface density, the second interface density being a density value of an interface of the second casing and the first annular media and the third interface density being a density value of an interface of the second casing and the second annular media, calculate an annular media hydrogen index of each of the first annular media and the second annular media, calculate an open-hole hydrogen index of the formation using the open-hole neutron porosity log data, and a cased-hole hydrogen index of the wellbore using the cased-hole neutron data, calculate a second width of the interface of the second casing and the first annular media and a third width of the interface of the second casing and the second annular media via a fifth inverse modeling operation performed on the second and third interface densities, the annular media hydrogen index, the open-hole hydrogen index, and the cased-hole hydrogen index, perform a sixth inverse modeling operation using the second and third widths to calculate the second interface density and the third interface density, and compare the second interface density and the third interface density calculated via the fourth inverse modeling operation with the second interface density and the third interface density calculated via the sixth inverse modeling operation. Element 17: wherein the processor is further configured to obtain the first, second, third interface densities and a fourth interface density when the second interface density calculated via the fourth inverse modeling operation is within a desired proximity of the second interface density calculated via the sixth inverse modeling operation, and the third interface density calculated via the fourth inverse modeling operation is within a desired proximity of the third interface density calculated via the sixth inverse modeling operation, the fourth interface density being a density value of an interface of the formation and the second annular media. Element 18: wherein the processor is further configured to recalculate at least one of the second interface density and the third interface density calculated via the fourth inverse modeling operation when the second interface density calculated via the fourth inverse modeling operation is not within a desired proximity of the second interface density calculated via the sixth inverse modeling operation, or when the third interface density calculated via the fourth inverse modeling operation is not within a desired proximity of the third interface density calculated via the sixth inverse modeling operation.

By way of non-limiting example, exemplary combinations applicable to A and B include: Element 1 with Element 2; Element 1 with Element 3; Element 2 with Element 4; Element 4 with Element 5; Element 4 with Element 6; Element 6 with Element 7; Element 7 with Element 8; Element 7 with Element 9; Element 10 with Element 11; Element 10 with Element 12; Element 11 with Element 13; Element 13 with Element 14; Element 13 with Element 15; Element 15 with Element 16; Element 16 with Element 17; and Element 16 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    introducing a tool string into a wellbore drilled through a formation, the wellbore at least partially lined with a first casing and a second casing concentrically overlapping a portion of the first casing, wherein a first annulus is defined between the first and second casings and filled with a first annular media, and a second annulus is defined between the second casing and a wall of the wellbore and filled with a second annular media;
    obtaining sonic data of the first and second annular media using a sonic wave emitted from a sonic tool included in the tool string;
    obtaining, from the sonic data, an amplitude, a frequency, and a phase of the sonic wave as altered by the first and second annular media;
    obtaining a first density value of the first annular media using the amplitude, the frequency, and the phase obtained from the sonic data;
    obtaining ultrasonic data of the first annular media using an ultrasonic wave emitted from an ultrasonic tool included in the tool string;
    obtaining, from the ultrasonic data, an amplitude, a frequency, and a phase of the ultrasonic wave as altered by the first annular media;
    obtaining a second density value of the first annular media using the amplitude, the frequency, and the phase obtained from the ultrasonic data;
    obtaining density data of the first annular media using gamma rays emitted by a density tool included in the tool string;
    obtaining, from the density data, far counts, near counts, and an energy spectrum of the first annular media;
    obtaining cased-hole neutron data using a neutron porosity tool included in the tool string;
    obtaining, from the cased-hole neutron data, far counts and near counts of gamma rays generated via neutron scattering due to one or more of the first and second casings, the first and second annular media, and the formation, and to obtain an energy spectrum of the formation and the first and second annular media;
    obtaining open-hole neutron porosity log data from measurements performed on the formation prior to casing the wellbore;
    obtaining, from the open-hole neutron porosity log data, far counts and near counts of gamma rays generated due to neutron scattering in the formation, and to obtain an energy spectrum of the formation; and
    determining a bond quality between cement in the first annular media and the first and second casings, and a bond quality between cement in the second annular media and the second casing and the formation based on the first density value, the second density value, the density data, the cased-hole neutron data, and the open-hole neutron porosity log data.

2. The method of claim 1, further comprising:
    performing a first inverse modeling operation on the amplitude, the frequency, and the phase obtained from the sonic data to obtain the first density value of the first annular media based on an acoustic impedance characteristic of the first annular media;
    performing a second inverse modeling operation on the amplitude, the frequency, and the phase obtained from the ultrasonic data to obtain the second density value of the first annular media based on the acoustic impedance characteristic of the first annular media; and
    comparing the first density value and the second density value to determine whether the first and second density values are within a desired proximity of each other.

3. The method of claim 2, further comprising obtaining a first interface density from the first density value when the first and second density values are within a desired proximity of each other, the first interface density being a density value of an interface of the first casing and the first annular media.

4. The method of claim 2, further comprising recalculating at least one of the first density value and the second density value when the first and second density values are not within the desired proximity of each other.

5. The method of claim 3, further comprising
    obtaining a third density value of the first annular media by performing a third inverse modeling operation using the first interface density, and far counts, near counts, and an energy spectrum of the first annular media obtained from the density data;
    obtaining a second interface density based on the third density value, the second interface density being a density value of the interface of the first casing and the first annular media; and
    comparing the first interface density with the second interface density and obtaining a density of the interface of the first casing and the first annular media when the first and second interface densities are within a desired proximity of each other.

6. The method of claim 5, further comprising recalculating at least one of the first and second density values when the first and second interface densities are not within the desired proximity of each other.

7. The method of claim 5, further comprising obtaining a first width of the interface at the first casing and the first annular media when the first and second interface densities are within the desired proximity of each other.

8. The method of claim 7, further comprising:
    performing a fourth inverse modeling operation using the density of the first annular media and the first width to calculate a second interface density and a third interface density, the second interface density being a density value of an interface of the second casing and the first annular media and the third interface density being a density value of an interface of the second casing and the second annular media;
    calculating an annular media hydrogen index of each of the first annular media and the second annular media;
    calculating an open-hole hydrogen index of the formation using the open-hole neutron porosity log data, and a cased-hole hydrogen index of the wellbore using the cased-hole neutron data;
    calculating a second width of the interface of the second casing and the first annular media and a third width of the interface of the second casing and the second annular media via a fifth inverse modeling operation performed on the second and third interface densities, the annular media hydrogen index, the open-hole hydrogen index, and the cased-hole hydrogen index;
    performing a sixth inverse modeling operation using the second and third widths to calculate the second interface density and the third interface density; and
    comparing the second interface density and the third interface density calculated via the fourth inverse modeling operation with the second interface density and the third interface density calculated via the sixth inverse modeling operation.

9. The method of claim 8, further comprising obtaining the first, second, third interface densities and a fourth interface density when the second interface density calculated via the fourth inverse modeling operation is within a desired proximity of the second interface density calculated via the sixth inverse modeling operation, and the third interface density calculated via the fourth inverse modeling operation is within a desired proximity of the third interface density calculated via the sixth inverse modeling operation, the fourth interface density being a density value of an interface of the formation and the second annular media.

10. The method of claim 8, further comprising recalculating at least one of the second interface density and the third interface density calculated via the fourth inverse modeling operation when the second interface density calculated via the fourth inverse modeling operation is not within a desired proximity of the second interface density calculated via the sixth inverse modeling operation, or when the third interface density calculated via the fourth inverse modeling operation is not within a desired proximity of the third interface density calculated via the sixth inverse modeling operation.

11. A well system, comprising:
a tool string conveyable into a wellbore drilled through a formation, wherein the wellbore is at least partially lined with a first casing and a second casing concentrically overlapping a least a portion of the first casing, and wherein a first annulus is defined between the first and second casings and filled with a first annular media, and a second annulus is defined between the second casing and wellbore and filled with a second annular media; and
a computer system including a processor and a non-transitory computer readable medium, the computer system being communicatively coupled to the tool string and the computer readable medium storing a computer readable program code that, when executed by the processor, configures the processor to:
operate a sonic tool included in the tool string to obtain sonic data of the first and second annular media using a sonic wave emitted by the sonic tool;
obtain, from the sonic data, an amplitude, a frequency, and a phase of the sonic wave as altered by the first and second annular media;
obtain a first density value of the first annular media using the amplitude, the frequency, and the phase obtained from the sonic data;
operate an ultrasonic tool included in the tool string to obtain ultrasonic data of the first annular media using an ultrasonic wave emitted from the ultrasonic tool;
obtain, from the ultrasonic data, an amplitude, a frequency, and a phase of the ultrasonic wave as altered by the first annular media;
obtain a second density value of the first annular media using the amplitude, the frequency, and the phase obtained from the ultrasonic data;
operate a density tool included in the tool string to obtain density data of the first annular media using gamma rays emitted by the density tool;
obtain, from the density data, far counts, near counts, and an energy spectrum of the first annular media;
operate a neutron porosity tool included in the tool string to obtain cased-hole neutron data;
obtain, from the cased-hole neutron data, far counts and near counts of gamma rays generated via neutron scattering due to one or more of the first and second casings, the first and second annular media, and the formation, and to obtain an energy spectrum of the formation and first and second annular media;
obtain open-hole neutron porosity log data from measurements performed on the formation prior to casing the wellbore;
obtain, from the open-hole neutron porosity log data, far counts and near counts of gamma rays generated due to neutron scattering in the formation, and to obtain an energy spectrum of the formation; and
determine a bond quality between cement in the first annular media and the first and second casings, and a bond quality between cement in the second annular media and the second casing and the formation based on the first density value, the second density value, the density data, the cased-hole neutron data, and the open-hole neutron porosity log data.

12. The system of claim 11, wherein the processor is further configured to:
perform a first inverse modeling operation on the amplitude, the frequency, and the phase obtained from the sonic data to obtain the first density value of the first annular media based on an acoustic impedance characteristic of the first annular media;
perform a second inverse modeling operation on the amplitude, the frequency, and the phase obtained from the ultrasonic data to obtain the second density value of the first annular media based on the acoustic impedance characteristic of the first annular media; and
compare the first density value and the second density value to determine whether the first and second density values are within a desired proximity of each other.

13. The system of claim 12, wherein the processor is further configured to obtain a first interface density from the first density value when the first and second density values are within a desired proximity of each other, the first interface density being a density value of an interface of the first casing and the first annular media.

14. The system of claim 12, wherein the processor is further configured to recalculate at least one of the first density value and the second density value when the first and second density values are not within the desired proximity of each other.

15. The system of claim 13, wherein the processor is further configured to:
obtain a third density value of the first annular media by performing a third inverse modeling operation using the first interface density, and far counts, near counts, and an energy spectrum of the first annular media obtained from the density data;
obtain a second interface density based on the third density value, the second interface density being a density value of the interface of the first casing and the first annular media; and
compare the first interface density with the second interface density and obtaining a density of the interface of the first casing and the first annular media when the first and second interface densities are within a desired proximity of each other.

16. The system of claim 15, wherein the processor is further configured to recalculate at least one of the first and second density values when the first and second interface densities are not within the desired proximity of each other.

17. The system of claim 15, wherein the processor is further configured to calculate a first width of the interface at the first casing and the first annular media when the first and second interface densities are within the desired proximity of each other.

18. The system of claim 17, wherein the processor is further configured to:
perform a fourth inverse modeling operation using the density of the first annular media and the first width to calculate a second interface density and a third interface density, the second interface density being a density value of an interface of the second casing and the first annular media and the third interface density being a density value of an interface of the second casing and the second annular media;
calculate an annular media hydrogen index of each of the first annular media and the second annular media;
calculate an open-hole hydrogen index of the formation using the open-hole neutron porosity log data, and a cased-hole hydrogen index of the wellbore using the cased-hole neutron data;
calculate a second width of the interface of the second casing and the first annular media and a third width of the interface of the second casing and the second annular media via a fifth inverse modeling operation performed on the second and third interface densities, the annular media hydrogen index, the open-hole hydrogen index, and the cased-hole hydrogen index;
perform a sixth inverse modeling operation using the second and third widths to calculate the second interface density and the third interface density; and
compare the second interface density and the third interface density calculated via the fourth inverse modeling operation with the second interface density and the third interface density calculated via the sixth inverse modeling operation.

19. The system of claim 18, wherein the processor is further configured to obtain the first, second, third interface densities and a fourth interface density when the second interface density calculated via the fourth inverse modeling operation is within a desired proximity of the second interface density calculated via the sixth inverse modeling operation, and the third interface density calculated via the fourth inverse modeling operation is within a desired proximity of the third interface density calculated via the sixth inverse modeling operation, the fourth interface density being a density value of an interface of the formation and the second annular media.

20. The system of claim 18, wherein the processor is further configured to recalculate at least one of the second interface density and the third interface density calculated via the fourth inverse modeling operation when the second interface density calculated via the fourth inverse modeling operation is not within a desired proximity of the second interface density calculated via the sixth inverse modeling operation, or when the third interface density calculated via the fourth inverse modeling operation is not within a desired proximity of the third interface density calculated via the sixth inverse modeling operation.

* * * * *